Figure 1:
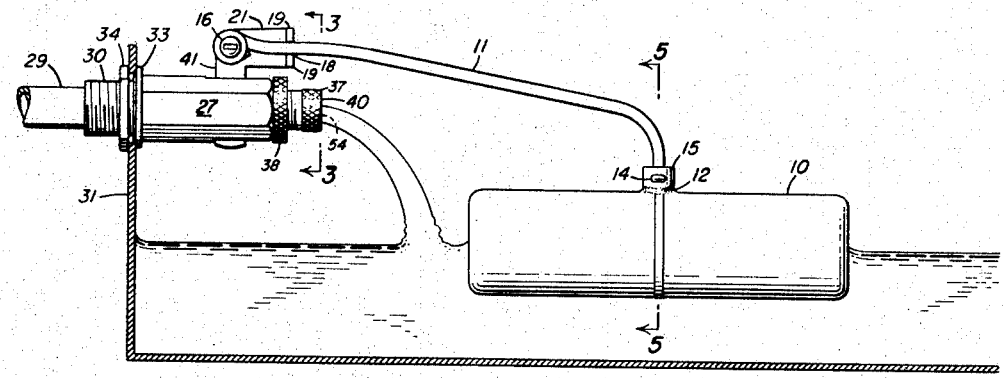

Sept. 19, 1967  L. S. MARTIN  3,342,206
POULTRY WATERING DEVICE WITH FLOAT-CONTROLLED SUPPLY
Filed Oct. 19, 1964

Inventor:
Lewis S. Martin
By Henry H. Snelling
his Attorney

3,342,206
POULTRY WATERING DEVICE WITH FLOAT-CONTROLLED SUPPLY

Lewis S. Martin, Harrisonburg, Va., assignor to Shenandoah Equipment Company, Harrisonburg, Va., a partnership
Filed Oct. 19, 1964, Ser. No. 404,978
5 Claims. (Cl. 137—436)

This invention relates to poultry waterers and has for its principal object the provision of an efficient float control valve which provides a simple and accurate manner of controlling the water level in the trough.

A second object of the invention is to provide means by which, no matter how low or high the pressure of the available water may be, the water discharged into the trough will be without any tendency to splash.

A further object of the invention is to provide a more positive and efficient cut-off of the inlet water.

A further object of the invention is to provide means aiding in cleaning the trough by allowing manual movement of the float to a convenient position and for returning it to its original setting without the need for a tool.

A still further but important feature of the invention is the use of a stem-pivoted cylindrical float whereby the water level in an elongated trough may closely be controlled and the buoyancy of the float fully utilized by constantly having the axis of the float parallel to the water level.

Figure 2:
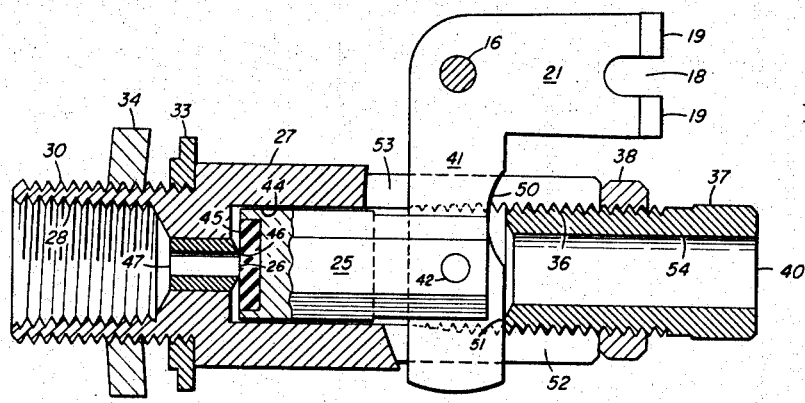
Figures 3, 4, 5:
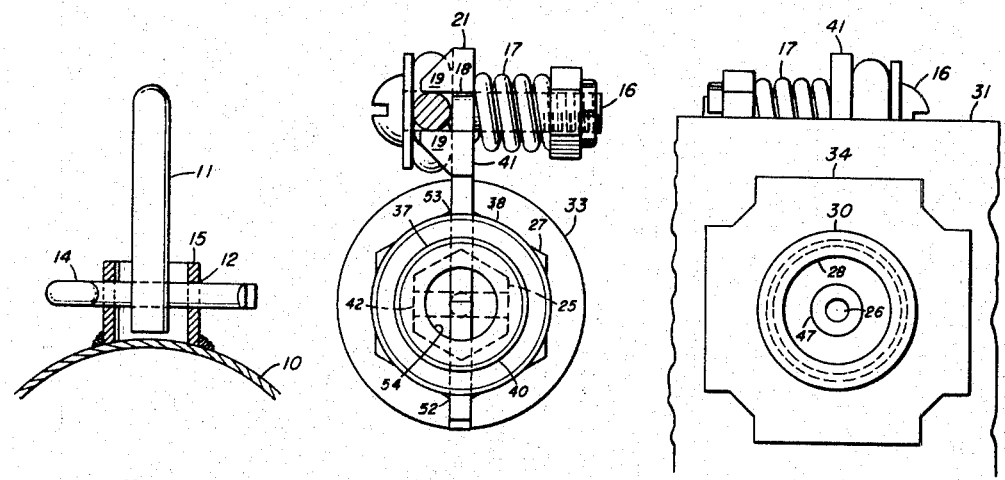

In the drawings:

FIGURE 1 is a side elevation of the device.
FIGURE 2 is a central section through the valve.
FIGURE 3 is an end elevation of the valve.
FIGURE 4 is a similar view at the opposite end and
FIGURE 5 is a central cross-section through the hinge of the float.

The valve is intended for use in a poultry trough usually having a V bottom and which may be as much as sixty or more feet long with a water level which should be held closely to a chosen minimum and should allow touching without undue friction between the float and either side of the trough. The float 10 therefore is made of two similar pressed metal or plastic halves joined centrally in any well-known manner as by soldering if metal, so that the float will be a cylinder, preferably being pivoted to its stem 11 as at 12 in any desired means so as to give greater buoyancy by remaining parallel to the water surface. A cotter pin 14 serves nicely as the pivot, and allows considerable side play within the cylindrical extension 15 to minimize rubbing against the side of the trough. The stem 11 is secured to a bolt 16 and is resiliently held in a slot 18 between two lugs 19 extending at right angles from the upper arm of an inverted L-shaped lever 21 which moves a slide 25, preferably hexagonal in cross-section, to open or close the water inlet opening 26 as governed by the lowering or rising of the float 10. A spring 17 surrounds the bolt shank and allows the stem to be moved out of its slot 18 to move the float out of the way when cleaning the trough.

The main body 27 of the valve is internally threaded as at 28 to receive an inlet pipe 29 and is externally threaded as at 30 to mount the valve on a trough 31. The bushing 33 is used when the end hole in the trough is larger than the standard. The lock nut 34 binds against the outside of the trough. On the other or discharge end of the valve the body 27 is internally threaded as at 36 to receive an adjusting plug 40 having a knurled end 37 for convenient turning and when adjusted is fastened by a lock nut 38 also knurled for manual turning.

The longer and somewhat vertical arm 41 of the lever 21 is pivoted as at 42 to a slide 25 which moves loosely in bore 44 and has an embedded rubber closure 45 which engages the rim 46 of a stainless steel insert 47 which firmly closes the hole in the latter upon a light touch. The lever 21 is not fastened to the body 27 of the valve but can move axially in the bore 44 in slots 52 and 53 and can therefore have limited free movement with respect to the body of the valve. Such construction insures that the planes of the rim and of the flat face of the closure shall be exactly parallel as the inlet water is shut off.

When the water in the trough is low a small arcuate depression 50 in the side of the vertical arm 41 of the lever, insures free flow through the central bore in the stainless steel insert 47 and when the water level is nearly up to that desired, this arm 41 engages the edge of the hollow adjusting plug 40 at point 51 and then rocks about this point as a fulcrum thus moving the loosely fitting slide 25 to close the inlet opening. The lower slot in main body 27 is of a depth so as to pivot arm 41 when float is in extreme low position and act as a lever to force plunger slide 25 away from stainless steel seat 47. With an available high pressure at the water inlet, the adjusting plug is screwed in quite far but with only low pressure available the plug is moved farther out so as to decrease the pressure on the seat, restricting the water inlet port, while allowing greater float travel. Moving the adjusting plug all the way to the left locks the float against movement and entirely shuts off the water.

Although the water could discharge through the lower slot 52 or a nearby opening, it is preferred that the adjusting plug 40 be hollow as stated, the smooth bore 54 thus discharging the water almost without force in a gentle curve, because of the restriction of the flow, consequently avoiding all splashing in the trough.

What I claim is:

1. In a valve for controlling the water level in a trough, a body having a main bore, a water inlet discharging into said bore at one end thereof, a hollow adjusting plug at the other end of the bore, having a smooth central opening through which water is discharged into the trough, a slide loosely positioned in the bore and movable axially to open or close the water inlet, a float control lever for moving the slide, the lever having a vertical arm passing through slots in the body and having a recess whereby water may pass into the central opening when the float rises toward the desired water level, the float is an elongated cylinder and is pivotally connected to the lever by a stem so that its axis remains parallel to the water level thus providing maximum buoyancy, and the stem is secured to the lever by a spring-pressed bolt passing transversely through the lever and the stem and is therefore resiliently held but may be released by compressing the spring to move the float through an angle of over 90° whereby to make easier the cleaning of the trough by movement of the float out of the way, the bolt is loosely pivoted in the lever, and the bolt head is spring-pressed against the lever, and the lever carries a pair of spaced lugs between which the stem is held by the spring from which position the stem may be released by angular movement of the stem away from the lever.

2. The device of claim 1 in which the receptacle is an elongated trough with parallel side walls and the pivotal connection between the stem and the float allows side movement on either side to an extent at least equal to the transverse width of the stem, whereby to lessen friction between the float and the side walls of the trough as the float rises and falls with the water level.

3. The device of claim 1 in which the adjusting plug is hollow and has a threaded connection with the valve body and the lever is recessed to clear the upper edge of the plug as the lower edge of the plug is engaged.

4. The device of claim 3 in which the lever is L-shaped, one generally horizontal arm being connected to the float and the other arm passing loosely in slots in the valve body and out of contact with the adjusting plug when the receptacle is being filled with water.

5. The device of claim 1 in which the water inlet is an insert having an annular rim and the slide carries a flat faced rubber element to engage the rim, the slide is pivoted to the lever so that the planes of the rim and of the flat faced element will coincide as the water is being shut off by the rise of the float.

References Cited

UNITED STATES PATENTS

| | | | |
|---|---|---|---|
| 1,055,778 | 3/1913 | Meyer | 137—443 |
| 1,280,326 | 10/1918 | Stoffel | 137—441 X |
| 1,440,198 | 12/1922 | Wissing | 137—426 |
| 2,514,532 | 7/1950 | Allen et al. | 251—328 |
| 2,766,769 | 10/1956 | Carnahan | 137—441 X |
| 3,185,134 | 5/1965 | Sheets | 119—80 |

FOREIGN PATENTS 189,691  12/1922  Great Britain.

WILLIAM F. O'DEA, *Primary Examiner.*

D. R. MATTHEWS, *Assistant Examiner.*